S. THEOBALD.
COFFEE-POT.
No. 177,173. Patented May 9, 1876.
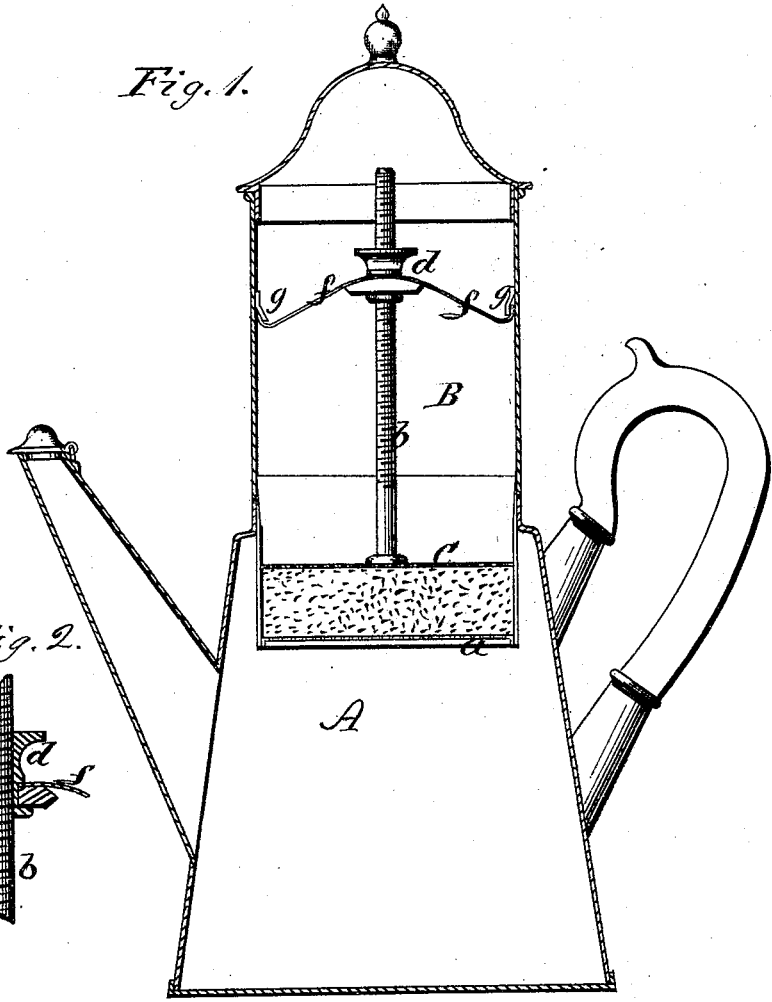
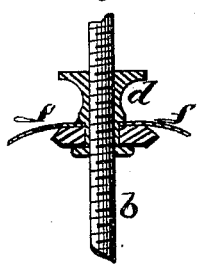
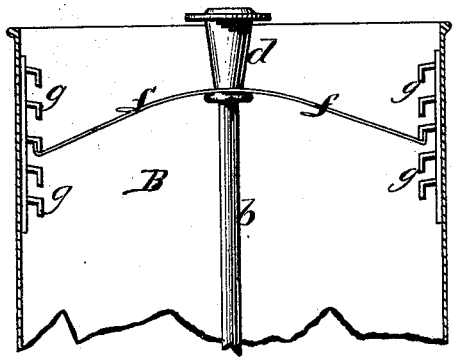
WITNESSES
INVENTOR
Samuel Theobald,
By J. I. Brown, his Attorney.

UNITED STATES PATENT OFFICE.

SAMUEL THEOBALD, OF BALTIMORE, MARYLAND.

IMPROVEMENT IN COFFEE-POTS.

Specification forming part of Letters Patent No. 177,173, dated May 9, 1876; application filed November 4, 1875.

*To all whom it may concern:*

Be it known that I, SAMUEL THEOBALD, of Baltimore, Baltimore county, in the State of Maryland, have invented an Improvement in Coffee-Pots; and I do hereby declare that the following is a full and exact description thereof, reference being had to the accompanying drawings, making part of this specification—

Figure 1 being a central vertical section of a coffee-pot and accompanying apparatus for making coffee, provided with my improvement; Fig. 2, a section of a detached part, represented on a larger scale; Fig. 3, a partial section, corresponding to the section in Fig. 1, showing a modified construction of my improvement.

Like letters designate corresponding parts in all of the figures.

My improvement is upon the kind of coffee-making apparatus in which the decoction and aroma of the coffee are obtained by the simple percolation of hot water through the coffee. In such apparatus, ordinarily, the ground coffee is either simply placed loosely in the percolating cup or vessel, or is held down by the simple weight of a perforated cover.

My invention consists in the employment of a cover or top plate pressed down upon the coffee with an elastic pressure, the said pressure-plate being adjustable in height in the percolating-vessel, to adapt it to different quantities of coffee placed therein.

In the drawings, A represents a coffee-pot, and B a percolating cup or vessel placed in the top of the coffee-pot. The ground coffee is placed upon a finely-perforated bottom, $a$, of the said percolating-vessel. Upon the coffee I place a pressure-plate, C, finely perforated also, to allow the hot water to freely pass through it into the coffee beneath. From the center of this pressure-plate a stem, $b$, extends vertically upward as far as necessary for the purpose intended. Upon the upper part of this stem I generally cut a screw-thread, as shown in Fig. 1; and a nut, $d$, screws thereon, to adjust the height of the pressure-plate in the vessel. On this nut is swiveled an elastic cross-bar, $f$, the ends of which hook under two projections, $g\ g$, respectively on opposite sides of the inner surface of the percolating-vessel near its upper edge.

With this construction, after the coffee is put into the percolating-vessel, the pressure-plate C is placed over it, and the elastic cross-bar $f$ is hooked under the projections $g\ g$. The swivel-nut $d$ is then turned so as to force the pressure-plate down upon the coffee with as much pressure as desired, the elasticity of the cross-bar yielding if any excess of pressure results. The effect is to compact the coffee, so that the water percolates through it much more slowly, thereby more thoroughly extracting the valuable constituents, and making a stronger decoction with the same amount of the ground coffee. The pressure-plate also prevents any floating of the coffee on the water. The cross-bar is readily disengaged from the projections $g\ g$ by slipping it sidewise, and the pressure-plate can then be withdrawn from the vessel without obstruction.

In the modified construction shown in Fig. 3, instead of a screw-thread on the stem $b$ of the pressure-plate, there is a simple swivel-sleeve, $d$, to hold the cross-bar $f$ and slide on the stem, and there are sets of projections or notches $g\ g$ on opposite sides of the inner periphery of the vessel at different heights, under any pair of which the cross-bar may be hooked to produce the pressure desired. Any other equivalent construction may be employed instead thereof.

What I claim as my invention, and desire to secure by Letters Patent, is—

The pressure-plate C, provided with the stem $b$ and adjustable elastic cross-bar $f$, in combination with a coffee-percolating vessel, B, substantially as and for the purpose herein specified.

Specification signed by me this 7th day of September, 1875.

SAMUEL THEOBALD.

Witnesses:
J. S. BROWN,
F. B. TOWNSEND.